D. T. SHARPLES.
MILKING APPARATUS.
APPLICATION FILED JAN. 5, 1911.
1,014,671.
Patented Jan. 16, 1912.
4 SHEETS—SHEET 3.
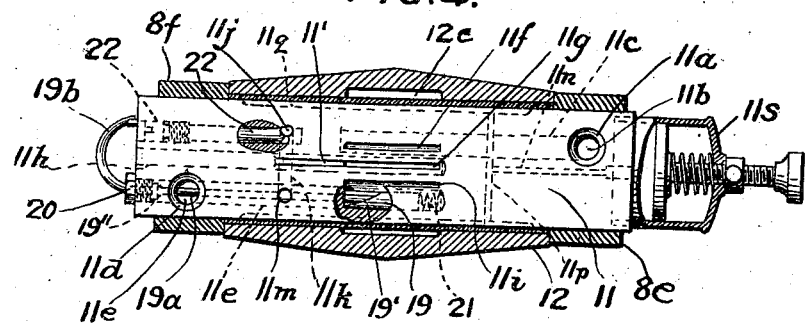
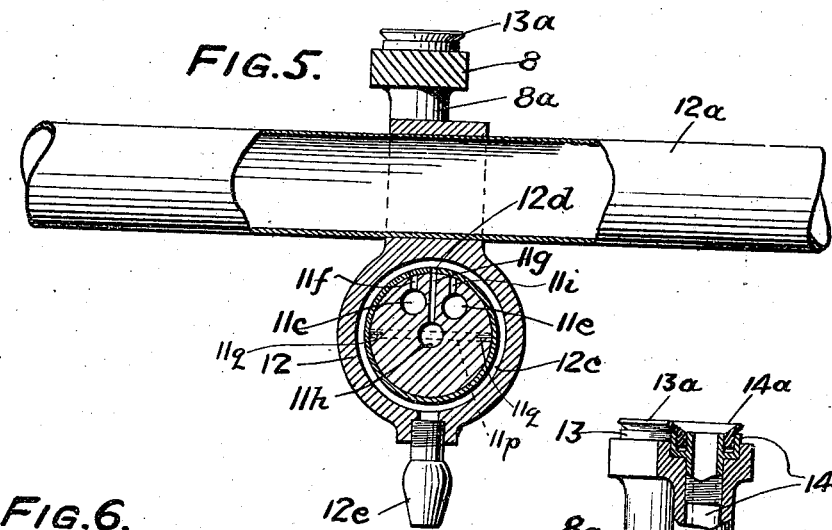
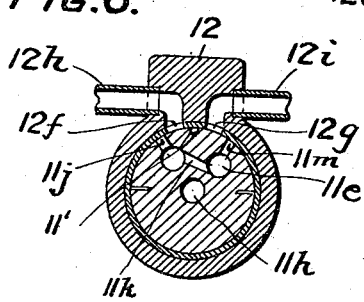
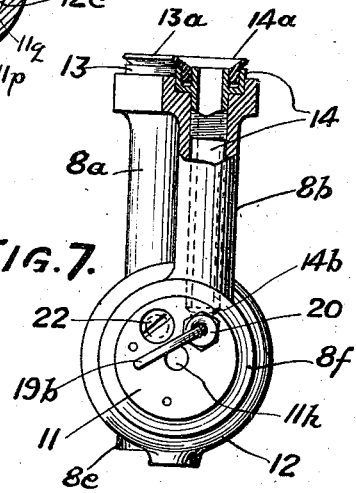
WITNESSES:
INVENTOR
David T. Sharples.
BY
Charles N. Butler
ATTORNEY

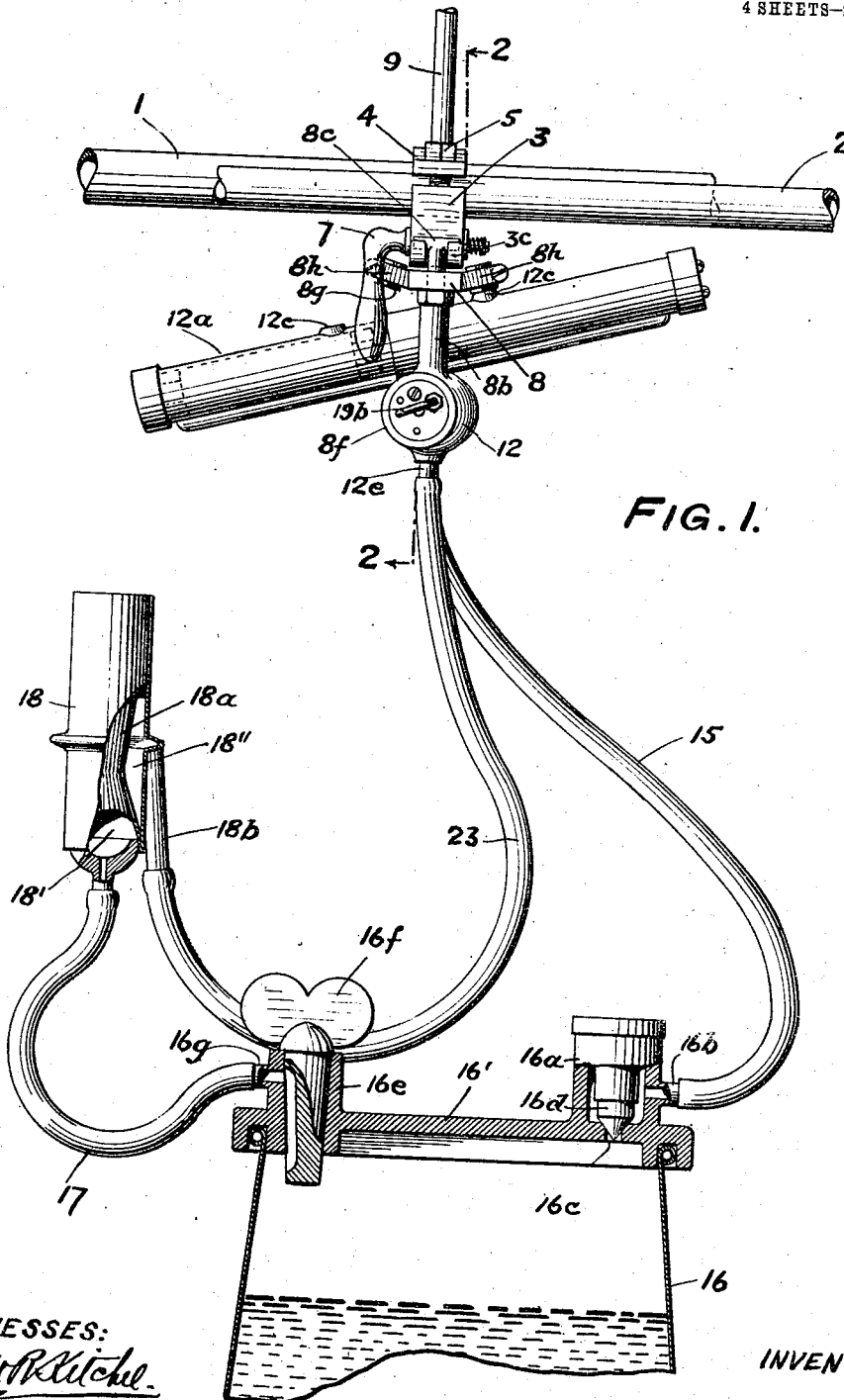

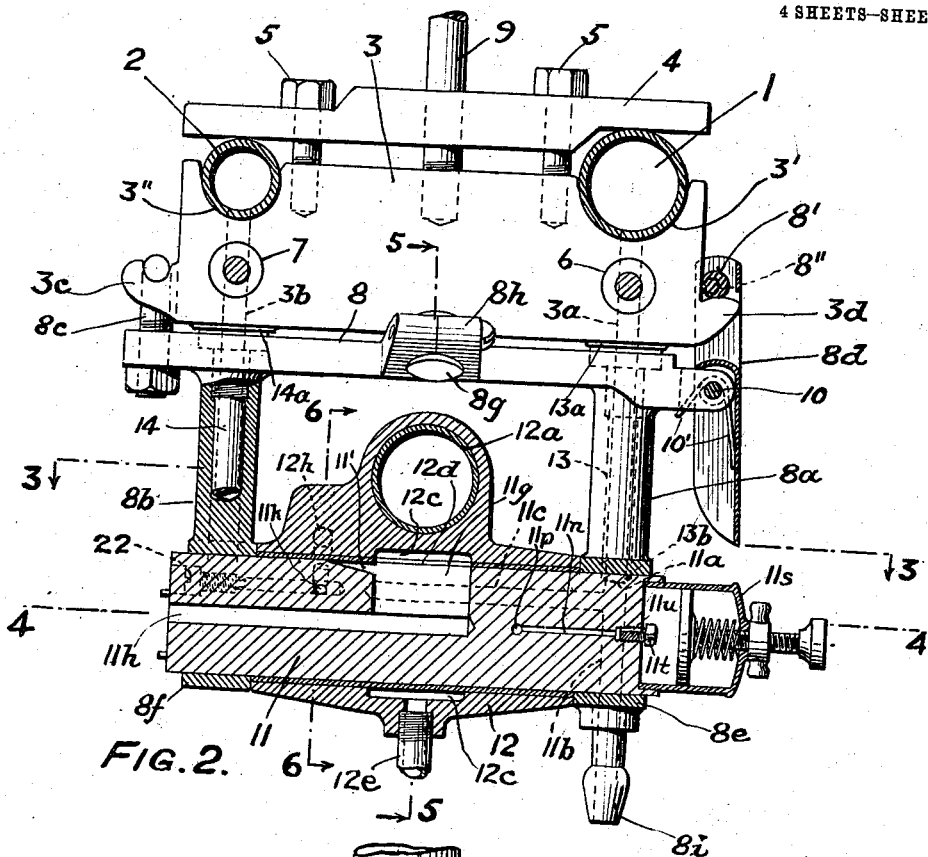

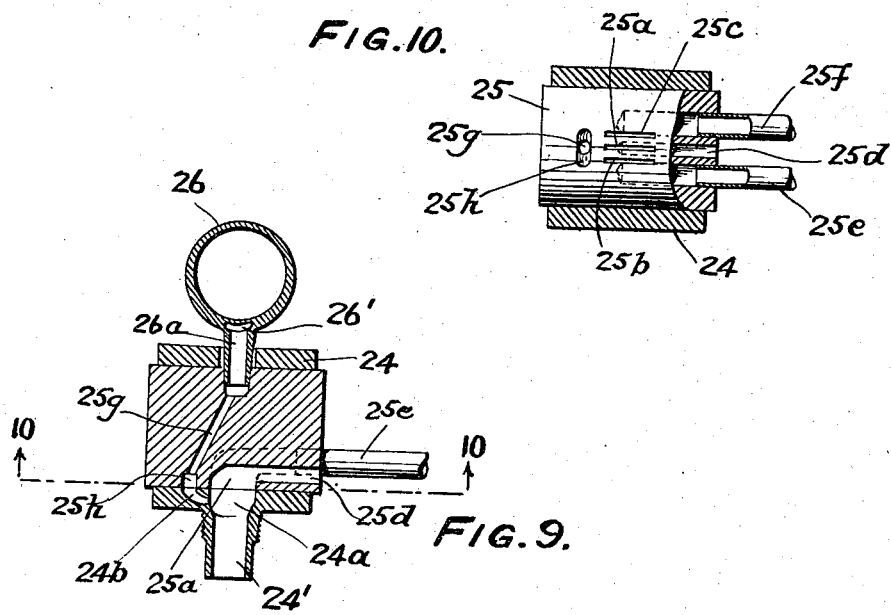
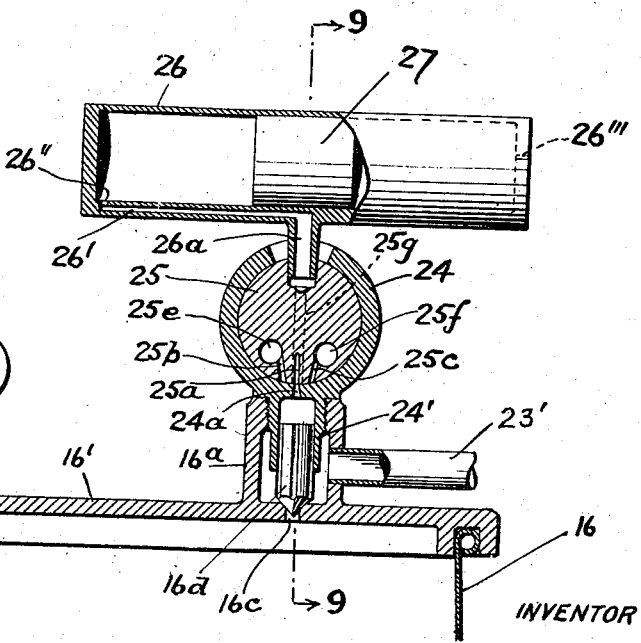

UNITED STATES PATENT OFFICE.

DAVID TOWNSEND SHARPLES, OF WEST CHESTER, PENNSYLVANIA.

MILKING APPARATUS.

1,014,671.  Specification of Letters Patent.  Patented Jan. 16, 1912.

Application filed January 5, 1911. Serial No. 600,963.

*To all whom it may concern:*

Be it known that I, DAVID TOWNSEND SHARPLES, a citizen of the United States, residing at West Chester, in the county of Chester and State of Pennsylvania, have invented certain Improvements in Milking Apparatus, of which the following is a specification.

My improvements in milking apparatus relate to means for effecting the pulsating action desired in such apparatus, and its leading object is to provide a pulsator of improved construction and efficiency.

The invention, in its preferred form, comprises the combination, with pressure and vacuum apparatus, of a pulsator having a bearing member provided with passages connected with the respective conduits, a journaled member provided with passages adapted for communication with the passages of the bearing member, a cylinder on the journaled member having passages communicating with passages aforesaid, and a piston adapted to be reciprocated by pressure in said cylinder to rock said journaled member. In this construction, a fitting is applied to the conduits and a hanger for the valve mechanism is connected by quick coupling means to the fitting, means being provided whereby periodic pressures alternating with longer periods of suction are applied to the outer chambers of the teat cups, while suction is applied through a milk receiver to the inner chamber of the teat cups. But the construction of the pulsator may be modified as by having a stationary valve member supported on the milk pail, a valve member journaled therein, and a tilter tube fixed to the journaled member. The apparatus embodying these improvements is susceptible of ready adjustment to regulate to the desired relation the relative periods of applying vacuum and pressure, as well as the relative degrees thereof.

The characteristic construction and operation of the apparatus, with the advantages thereof, are more fully disclosed in the following description and the accompanying drawings.

In the drawings, Figure 1 is a sectional elevation of apparatus embodying my improvements; Fig. 2 is an enlarged sectional view taken on the line 2—2 of Fig. 1; Fig. 3 is a sectional view taken on the line 3—3 of Fig. 2; Fig. 4 is a sectional view taken on the line 4—4 of Fig. 2; Fig. 5 is a sectional view taken on the line 5—5 of Fig. 2; Fig. 6 is a sectional view taken on the line 6—6 of Fig. 2; Fig. 7 is an end elevation of the hanger and valve body with parts removed; Fig. 8 is a sectional elevation representing a modified form of the apparatus; Fig. 9 is a sectional view of details taken on the line 9—9 of Fig. 8; and Fig. 10 is an irregular sectional view taken through the stationary bearing on the line 10—10 of Fig. 9.

The apparatus, as illustrated in Figs. 1 to 7 inclusive, comprises a pipe 1 from which air is exhausted and a pipe 2 in which air is compressed. A fitting 3, provided with the seats $3'$ and $3''$, is clamped on the vacuum and pressure pipes 1 and 2 by means of the bearing member 4, which rests on the pipes, and the screws 5 which pass through the member 4 into the member 3; the fitting containing the passages $3^a$ and $3^b$ which communicate with the respective pipes 1 and 2 and are controlled by the respective valves 6 and 7. End bearings $3^c$ and $3^d$ are formed on the fitting for the connection of the hanger 8 which supports the valve mechanism, and a tie rod 9 passes through the part 4 into the part 3 to support the apparatus. The hanger 8 is provided with the T-bolt $8^c$, which hooks on and makes a hinged engagement with the bifurcated bearing $3^c$, and with the latch $8^d$ having the bar $8'$ which rides over and snaps on the catch or bearing $3^d$. The latch is pivoted intermediate of its length on the fulcrum 10 and is pressed by a spring $10'$ which is held on the fulcrum, while the bar $8'$ is provided with eccentric bearings $8''$ permitting its adjustment to regulate the action of the latch and the pressure of the hanger against the fitting, the pressure being likewise regulable by the adjustment of the bolt $8^c$.

The hanger 8 is provided with the hollow columns $8^a$ and $8^b$ having on the lower ends thereof the respective bearing rings $8^e$ and $8^f$. A cylindrical valve body 11 is supported by the rings $8^e$ and $8^f$ and has journaled thereon, between the rings, a valve 12 which carries a cylinder $12^a$ containing a piston $12^b$, the valve and cylinder having a rocking movement limited by the engagement of the bosses $12^c$ of the latter with the cushions $8^g$ on the arms $8^h$ of the hanger. A tube 13 is screwed into and passes through the column $8^a$, the tube having a rubber gasket $13^a$ set in the top thereof, for making close engagement with the fitting 3 around the passage 3ᵃ, and a lower end 13ᵇ beveled to make a close fit with the port 11ᵃ of the intersecting passages 11ᵇ and 11ᶜ of the valve body 11. A tube 14 is screwed into and passes through the column 8ᵇ, the tube having a rubber gasket 14ᵃ set in the top thereof for making close engagement with the fitting 3 around the passage 3ᵇ and the lower end 14ᵇ beveled to make a close fit with the port 11ᵈ of the passage 11ᵉ in the valve body 11. The passage 11ᵇ communicates with the passage through the nipple 8ⁱ, which is connected to the rubber tube 15; the tube is connected with the interior of the pail 16 through the cover 16′ having the valve casing 16ᵃ provided with the nipple 16ᵇ which is engaged by the tube, the casing communicating with the interior of the pail through the port 16ᶜ controlled by the puppet valve 16ᵈ; and the interior of the pail is connected through the valve casing 16ᵉ, controlled by the valve 16ᶠ, and a nipple 16ᵍ thereof, with the rubber tube 17 which communicates with the inner chamber 18′ of a teat cup 18 having an outer chamber 18″ separated from the inner chamber by an elastic tube 18ᵃ. The body 11 has a port 11ᶠ communicating with the passage 11ᶜ, a port 11ᵍ with an intersecting channel 11′ communicating with a passage 11ʰ leading to the atmosphere, a port 11ⁱ communicating with the passage 11ᵉ, a port 11ʲ connected by the passage 11ᵏ with the passage 11ᵉ and a port 11ᵐ communicating with the passage 11ᵉ. A valve 19, having a V-shaped port 19′ adapted to register with the port 11ⁱ, is fixed on a valve stem 19ᵃ which can be turned by the handle 19ᵇ to adjust the passage through these ports, the stem being journaled in a nut 20 and having a collar 19″ which is pressed against the nut by a spring 21 disposed in the end of the passage 11ᵉ. A rod 22 is screwed into the body 11 so that it can be adjusted to regulate the passage 11ᵏ and the air flowing therethrough. The valve 12 is provided with the channel 12ᶜ adapted to communicate by the valve's port 12ᵈ alternately with the ports 11ᶠ, 11ᵍ, 11ⁱ when the valve is rocked. A nipple 12ᵉ connects the channel 12ᶜ with the rubber tube 23 which is connected with the nipple 18ᵇ communicating with the teat cup chamber 18″. Ports 12ᶠ and 12ᵍ of the valve 12 are connected by the respective ducts 12ʰ and 12ⁱ with the opposite ends of the cylinder or tilter-tube 12ᵃ, the ports 12ᶠ and 12ᵍ being adapted for registration with the respective ports 11ʲ and 11ᵐ by rocking the tube.

In operation, the hanger 8 is snapped to operative position in relation to the fixture 3. The valves 6 and 7 are opened and air is exhausted from the parts 13, 11ᵃ, 11ᵇ, 11ᶜ, 8ⁱ, 15, 16ᵃ and 16, while pressure is communicated through the parts 14, 11ᵈ, 11ᵉ and 11ᵏ to the ports 11ⁱ, 11ʲ and 11ᵐ. In either position of the tilter-tube 12ᵃ one or the other of the ports 11ʲ and 11ᵐ will be in registration with the corresponding port 12ᶠ or 12ᵍ, whereby pressure communicated through the duct 12ʰ or 12ⁱ with which communication has been established will move the piston 12ᵇ from the lower end of the tube toward the upper end from which the air passes through the other duct whose port is now in registration with the channel 11′ and the port 11ᵍ communicating with the atmosphere. The piston having passed beyond the center of the tube, the latter is rocked and compressed air is admitted to the now lower end thereof, whereby the piston is returned and tilts the tube back again. When, in the oscillation of the tube, the port 12ᵍ is in registration with the port 11ᵐ, the port 12ᵈ is in registration with the port 11ⁱ and pressure is communicated through the channel 12ᶜ and tube 23 to the teat cup chamber 18″. When the port 12ᶠ is in registration with the port 11ʲ, the port 12ᵈ registers with the port 11ᶠ and vacuum will be applied through the passage 12ᶜ and tube 23 to the teat cup chamber 18″. As the valve 19 can be adjusted to cut down the passage through the port 11ⁱ to any desired degree, the pressure communicated to the exterior teat cup chamber can be regulated, and as the rod 22 can be adjusted to control the air passing through the port 11ʲ, while the air passing through the port 11ᵐ is not reduced, the action of the piston 12ᵇ can be regulated so that it will be thrown more quickly when the ports 11ᵐ and 12ᵍ are in registration than when the ports 11ʲ and 12ᶠ register, whereby the time of registration between the ports 11ᶠ and 12ᵈ is longer than the time of registration between the ports 11ⁱ and 12ᵈ, and suction will be applied for the desired longer period to the teat cup chamber 18″ than is the pressure. The cup 18 being applied to the teat and the valve 16ᶠ opened, suction is applied to the chamber 18′ and suction alternating with pressure is applied to the chamber 18″.

The lubrication of the valve is effected by the application of an oil cup 11ˢ to an end of the valve body or arbor 11, in which is formed a longitudinal oil passage 11ⁿ communicating with a transverse passage 11ᵖ, the latter communicating at its ends with the longitudinal channels 11ᑫ for holding and distributing oil. The admission of oil from the cup 11ˢ to the passage 11ⁿ is controlled by a screw 11ᵗ having the flattened or grooved part 11ᵘ.

The construction may be modified as illustrated in Figs. 8 to 10 inclusive, where the valve casing 16ᵃ, on the cover 16′ of the pail 16, carries a valve seat or body 24. The body 24 is provided with a barrel 24′ which screws into the casing 16ᵃ and guides the valve 16ᵈ which controls the port 16ᶜ, the body having the ports 24ᵃ and 24ᵇ which communicate with the barrel. A cylindrical valve 25 is journaled in the body 24, and is provided with the ports 25ᵃ, 25ᵇ and 25ᶜ adapted for registration with the port 24ᵃ. The port 25ᵃ communicates with the atmosphere passage 25ᵈ, the port 25ᵇ communicates with the pressure duct 25ᵉ, and the port 25ᶜ communicates with the vacuum duct 25ᶠ. A cylinder 26, containing a piston 27, is provided with a nipple 26ᵃ which is seated in the valve 25 and communicates by the duct 26′ and port 26″ with an end of the cylinder, the other end of which is provided with a vent 26‴. The valve 25 is provided with a passage 25ᵍ which connects the nipple 26ᵃ with an elongated port 25ʰ, the latter being in constant communication with the port 24ᵇ. The cylinder or tilter-tube 26 will normally assume an inclined position with the piston 27 at the lower end thereof. Assuming that the port 25ᵇ registers with the port 24ᵃ, then air pressure is communicated through the tube 23′ which leads, as illustrated in Fig. 1, to the outer chamber of the teat cup, and through the passages 24ᵇ, 25ᵍ and 26′ to the lower end of the cylinder 26, the piston being moved toward the higher end of the cylinder which is tilted thereby and the port 25ᶜ brought into registration with the port 24ᵃ. Vacuum is now applied through the casing 16ᵃ to the tube 23′ and the exterior chamber of the teat cup; through the port 16ᶜ to the interior of the pail 16, and through the tube 17 to the interior chamber of the teat cup when the valve 16ᶠ is open. Simultaneously vacuum is applied to the elevated end of the cylinder 26 through the passages 24ᵇ, 25ᵍ and 26′, the piston being elevated by air pressure admitted through the opening 26‴.

In the foregoing constructions, since the outer chamber of the teat cup it directly connected with the atmosphere in the central position of the pulsator, the compressed air in this chamber will exhaust directly into the atmosphere and the vacuum in this chamber will be replaced by air supplied directly from the atmosphere, whereby a large saving is effected in the operations of applying pressure and creating vacuum in the chamber.

It will be observed that in each of the forms shown the valve ports are so placed that the weight of the oscillating mechanism maintains close contact and keeps the ports of the valve in close engagement with the bearing member or the ports thereof, whereby leakage is avoided.

The apparatus is not only simple and efficient in operation, but easily installed. The parts 3 and 4 can be clamped on the pneumatic tubes 1 and 2 at any point, the passages 3ᵃ and 3ᵇ can be drilled through the fitting into the tubes with avoidance of the usual difficulties of effecting registration between holes in the tubes and connections, and the tie rod 9 can be conveniently dropped from the desired point of the ceiling for supporting the parts depending thereon.

Having described my invention, I claim:

1. In a milking apparatus, a pulsator comprising a bearing member having a passage therein, a journaled member having a passage therein adapted for communication with the passage aforesaid, a tilter-tube connected with said journaled member, a piston in said tilter-tube, and means for connecting said tube with said passage of said journaled member.

2. In a milking apparatus, a pulsator comprising a valve body, a valve fulcrumed by means of said body, a tilting device fixed to said valve, a traveling device carried by said tilting device, and means whereby said traveling device is actuated to operate said tilting device.

3. In a milking apparatus, a pulsator comprising a bearing member, a journaled member supported by said bearing member, a cylinder fixed to said journaled member, a piston adapted to reciprocate in said cylinder, and means for reciprocating said piston in said cylinder.

4. In a milking apparatus, a pulsator comprising a valve body, a journaled valve fulcrumed by means of said body, a cylinder carried by said valve and a piston adapted to reciprocate in said cylinder, said mechanism having means whereby pressure is communicated to said cylinder and piston.

5. In a milking apparatus, a hanger having a bearing member, a valve body supported by said bearing member, a valve journaled on said body, and means for turning said valve on said body.

6. In a milking apparatus, a hanger having bearing rings, a cylindrical valve body supported by said rings, a valve journaled on said body between said rings, and means for rocking said valve on said body.

7. In a milking apparatus, the combination of a conduit, a fitting connected therewith, and a hanger connected with said fitting, with a valve mechanism comprising a bearing member supported by said hanger, a rocking member fulcrumed by said bearing member, and means for operating said rocking member.

8. In a milking apparatus, vacuum and pressure conduits, in combination with a fitting having passages communicating with said conduits, a hanger having passages communicating with the passages of said fitting, said fitting and hanger having coupling means, a stationary valve member supported by said hanger and having passages communicating with the passages thereof, and a rocking valve member fulcrumed by said stationary valve member, said rocking valve member having passages adapted for communication with the passages of said stationary valve member.

9. In a milking apparatus, a fitting having bearing members, a hanger having bearing members, said members comprising a hinge and a latch, and valve mechanism supported by said hanger.

10. In a milking apparatus, the combination of a fitting having passages, valves for controlling said passages, and bearings, with a hanger having passages communicating with the passages of said fitting, a bearing adapted for engaging a bearing of said fitting, and a latch adapted for engaging a second bearing of said fitting.

11. In a milking apparatus, the combination of a fitting having passages therein, with a hanger having means for engaging said fitting and columns containing passages communicating with the passages of said fitting, a valve body containing passages communicating with the passages of said columns, and a valve having a passage adapted to communicate with the passages of said body.

12. In a milking apparatus, the combination of a pulsator comprising a bearing member having a passage therein, a journaled member having passages therein adapted for communication with the passage aforesaid, and a cylinder for operating said journaled member and having a passage communicating with a passage of said journaled member, with a pail, a teat cup having an inner and an outer chamber, means for connecting said inner chamber with said pail, and means for connecting said pulsator with said outer chamber.

13. In a milking apparatus, a fitting containing passages, a hanger having hollow columns, tubes in said columns adapted to register with said passages, bearing members supported by said columns, a valve body supported by said members and engaged by said tubes, said body having passages communicating with said tubes, and a valve journaled on said body, said valve having a passage adapted for communication with the passages of said body.

14. In a milking apparatus, a pulsator comprising a stationary member and a journaled member fulcrumed by said stationary member, said members having passages which are caused to register by oscillating said journaled member, a cylinder carried by said journaled member, said cylinder containing a passage communicating with a passage of said journaled member, and a piston in said cylinder.

15. In a milking apparatus, a vacuum duct and a pressure duct, a pulsator and means for connecting said pulsator with said ducts; said pulsator comprising a member having a passage communicating with said vacuum duct and a passage communicating with said pressure duct, a second member having a passage adapted for communicating with said passages alternately, a cylinder having a passage adapted for communicating with the second named passage, and means for regulating the air pressure communicated through said connected passages to said cylinder.

16. In a milking apparatus, a stationary valve member, a journaled valve member fulcrumed by said stationary member, a cylinder carried by said journaled member, and a piston in said cylinder, said members having passages by which pressure is communicated to said cylinder and means for regulating said pressure.

17. In a milking apparatus, the combination of a teat cup having an outer chamber, with a pulsator comprising a stationary member and a journaled member having communicating passages, means whereby pressure and vacuum are applied under control of said members to said chamber, and means whereby the pressure period is rendered shorter than the vacuum period.

18. In a milking apparatus, a stationary valve member, a journaled valve member fulcrumed by said stationary member, a cylinder carried by said journaled member, and a piston in said cylinder, said members having means whereby pressure is communicated alternately to opposite ends of said cylinder and means whereby the pressures communicated to the different ends of the cylinder can be differentiated.

19. In a milking apparatus, the combination of a teat cup having an outer chamber, with an automatic pulsator whereby alternating periods of pressure and suction are applied to said chamber, and means whereby the periods of suction are rendered longer than the periods of pressure.

20. In a milking apparatus, a teat cup having an inner and an outer compartment, a receptacle connected with said inner compartment, a pulsator connected with said receptacle and outer compartment, and vacuum and pressure conduits connected with said pulsator, said pulsator having means whereby vacuum is applied through said receptacle to said inner compartment, pressure is applied intermittently to said outer compartment, vacuum is applied intermittently to said outer compartment, and the relative periods of the intermittent vacuum and pressure are varied.

21. In a milking apparatus, the combination of a pulsator, with a fitting, a pneumatic tube to which said fitting is fixed, and a tie rod whereby said fitting and tube are supported.

22. In a milking apparatus, a conduit, means comprising a fitting clamped on said conduit, said fitting and conduit having a continuous passage cut therein, and means comprising a pulsator having a passage communicating with the passage aforesaid.

23. In a milking apparatus, a pair of conduits, a fitting, means whereby said fitting is clamped on said conduits, said fitting having a pair of passages communicating with passages cut in the respective conduits, and means comprising a pulsator having passages communicating with passages aforesaid.

In witness whereof I have hereunto set my name this 24th day of December 1910, in the presence of the subscribing witnesses.

DAVID TOWNSEND SHARPLES.

Witnesses:
 MARY B. DARLINGTON,
 HENRY B. CARLISLE.

---

Copies of this patent may be obtained for five cents each, by addressing the "Commissioner of Patents, Washington, D. C."